(12) United States Patent
Grimes

(10) Patent No.: US 8,436,058 B2
(45) Date of Patent: *May 7, 2013

(54) METHODS FOR SEPARATION AND CONDITIONING OF PRODUCTS CONTAINING SUPER ABSORBENT POLYMERS

(75) Inventor: David Grimes, Greenfield, MA (US)

(73) Assignee: Knowaste International, LLC, West Bromwich, West Midlands (GB)

( * ) Notice: Subject to any disclaimer, the term of this patent is extended or adjusted under 35 U.S.C. 154(b) by 60 days.

This patent is subject to a terminal disclaimer.

(21) Appl. No.: 12/780,293

(22) Filed: May 14, 2010

(65) Prior Publication Data

US 2010/0292401 A1    Nov. 18, 2010

Related U.S. Application Data

(60) Provisional application No. 61/216,363, filed on May 16, 2009, provisional application No. 61/216,342, filed on May 16, 2009.

(51) Int. Cl.
*C08J 11/04* (2006.01)

(52) U.S. Cl.
USPC ... 521/40; 521/45; 241/4; 241/11; 241/24.18; 241/24.19; 528/485; 528/488; 528/490; 523/343; 209/245

(58) Field of Classification Search .......... 521/40–49.8; 528/480–503; 210/767–781; 162/60, 158, 162/164.1, 168.1; 562/512, 598, 600; 525/50, 525/329.4–330.4; 241/9, 11, 12, 16, 17, 241/21, 23, 24.1, 24.11, 24.18, 24.19, 24.21, 241/25; 209/11, 12.1, 18, 132, 233, 240, 209/245

See application file for complete search history.

(56) References Cited

U.S. PATENT DOCUMENTS

| | | | |
|---|---|---|---|
| 4,303,501 A * | 12/1981 | Steffens | 209/2 |
| 5,429,311 A | 7/1995 | Cina et al. | |
| 5,558,745 A | 9/1996 | Conway et al. | |
| 6,200,715 B1 | 3/2001 | Fuller et al. | |
| 6,238,516 B1 | 5/2001 | Watson et al. | |
| 7,407,912 B2 | 8/2008 | Mertens et al. | |
| 2007/0135563 A1 | 6/2007 | Simmons et al. | |
| 2010/0093949 A1 | 4/2010 | Herfert et al. | |

* cited by examiner

*Primary Examiner* — Frances Tischler
(74) *Attorney, Agent, or Firm* — Reed Smith LLP; William J. McNichol, Jr.

(57) ABSTRACT

Embodiments of the present disclosure include a method for separating a product comprising a super absorbent polymer, a fiber and a plastic to separate the product into components thereof, the method comprising adding water to the product, and pressing the product in order to separate the product into components comprising a plastics component and a super absorbent polymer and fiber component. Other methods of the present disclosure include a method for producing a reusable plastic, reusable paper fiber stream and a reusable super absorbent polymer from the treatment of a product comprising a super absorbent polymer, a fiber and a plastic. Still other embodiments of the present disclosure include a method for the treatment of wet super absorbent polymer, comprising salt assisted dehydration.

12 Claims, 2 Drawing Sheets

METHODS FOR SEPARATION AND CONDITIONING OF PRODUCTS CONTAINING SUPER ABSORBENT POLYMERS

CROSS REFERENCE

This application claims priority from provisional application No. 61/216,342, filed May 16, 2009 and provisional application No. 61/216,363, filed May 16, 2009, the entire contents of both applications which are incorporated herein by reference, including any references cited therein.

FIELD OF THE INVENTION

The invention relates to methods of separating products containing super absorbent polymers into their constituent parts, including a plastic component, super absorbent polymers, and cellulosic fibers, and further refinement of said constituent parts. Examples of such products include absorbent sanitary products, for example diapers.

BACKGROUND

As used herein, absorbent sanitary paper products include, for example, but not limited to, disposable diapers, incontinence products, feminine hygiene products, bedpads and other related absorbent and adsorbent products ("products"). These products typically consist of (i) a non-woven sheet formed from a liquid permeable material, for example a liquid permeable membrane formed from polypropylene, polyethylene, or woven products formed from cotton or rayon, (ii) a liquid impermeable back sheet formed from, for example, polyethylene, polypropylene, starch based degradable plastic films, woven cloth or rubber, and (iii) an adsorbent or absorbent core of air laid wood pulp fluff, commonly referred to as air felt, and/or synthetic pulp including polypropylene or polyethylene filaments that may be bonded or unbonded, hemp or other adsorbent fibrous material. The core is typically wrapped or encased in a creped envelope of wet strength tissue paper or a material with similar characteristics. The wrapping on the core may or may not be breathable, biodegradable, odour degradable or degradable or dissolvable by other means. The core usually also contains a super absorbent polymer (SAP) material, which is typically a polyacrylate, polyacrylamide, crosslinked starch or other hydrophilic component, which may be synthetic, and may be in granular, fibrous or laminate form, possessing the ability to bond with water, urine or other body fluids or retain them without substantial release or discharge from the absorbent portion. Diapers and incontinence products typically utilize pressure sensitive adhesives or refastenable tape tabs or similar closure mechanisms. Feminine hygiene pads and incontinence products often use pressure sensitive adhesives for glue lines to attach the pad or liner to the user's undergarments. Diaper and incontinence products typically utilize elastic, polyurethane, puckering and welding or adhesives to create close fitting cuffs around the leg and waist openings to provide a more leakproof fit.

Absorbent sanitary paper products are normally disposed of along with garbage generated by households, institutions, hotels and the like, by incineration or in landfill disposal sites. Incineration tends to result in air or other pollution being generated. Landfill disposal results in an accumulation of such products. Thus, the consequences of the convenience or necessity of use of absorbent sanitary paper products include problems relating to disposal of such products. In addition, use of either incineration or landfill disposal results in loss or destruction of the components of the absorbent sanitary paper products, rather than recycling some or all of those components to the same or other end-uses. The disposal problems are of ever increasing concern to environmental and governmental authorities, and means are required for effective disposal and utilization of used absorbent sanitary products. Additionally the disposal of the scraps and defective product post industrial diapers puts a burden on manufacturers and wastes valuable resources.

SUMMARY OF THE INVENTION

Embodiments of the present disclosure include a method for separating a product comprising a super absorbent polymer, a fiber and a plastic into components thereof, the method comprising adding water to the product, and pressing the product against a screen in order to separate the product into components comprising a plastics component and a super absorbent polymer and fiber component. Embodiments of this method include products that do not comprise a salt, and wherein the pressing method does not comprise a salt. In other embodiments, the products do not include alum either in the products or the method.

Other methods of the present disclosure include a method for producing a reusable plastic and a reusable super absorbent polymer from the separation of a product comprising a super absorbent polymer, a fiber and a plastic into components thereof. These embodiments include separating the product into components comprising a plastics component, and a super absorbent polymer/fiber component. These embodiments may further include removing water from the super absorbent polymer/fiber component with a method comprising salt assisted dehydration, and treating the plastics component with a composition comprising alum.

Other methods of the present disclosure include a method for producing a reusable plastic a reusable super absorbent polymer and reusable paper fiber from the treatment of a post industrial dry product comprising a super absorbent polymer. These embodiments include separating the product into components comprising a plastics component with some SAP and fiber, and a fiber component with some SAP. The method treats the SAP in the other plastic and fiber component streams to allow them to be used without the hazard of the SAP activating.

Still other embodiments of the present disclosure include a method for the treatment of wet super absorbent polymer, comprising contacting wet super absorbent polymer with a salt, decanting at least a portion of salt water and water extracted from the wet super absorbent polymer, evaporating a remaining portion of the salt water and water extracted from the wet super absorbent polymer, and removing dried salt from the super absorbent polymer.

Further embodiments of the present disclosure include a method of using recycled super absorbent polymer as an agglomerating agent, the method comprising treating the super absorbent polymer with a chemical in order to break the crosslinking bonds to form substantially uncrosslinked super absorbent polymer, and using the substantially uncrosslinked super absorbent polymer as an agglomerating agent.

DETAILED DESCRIPTION

Figure 1:
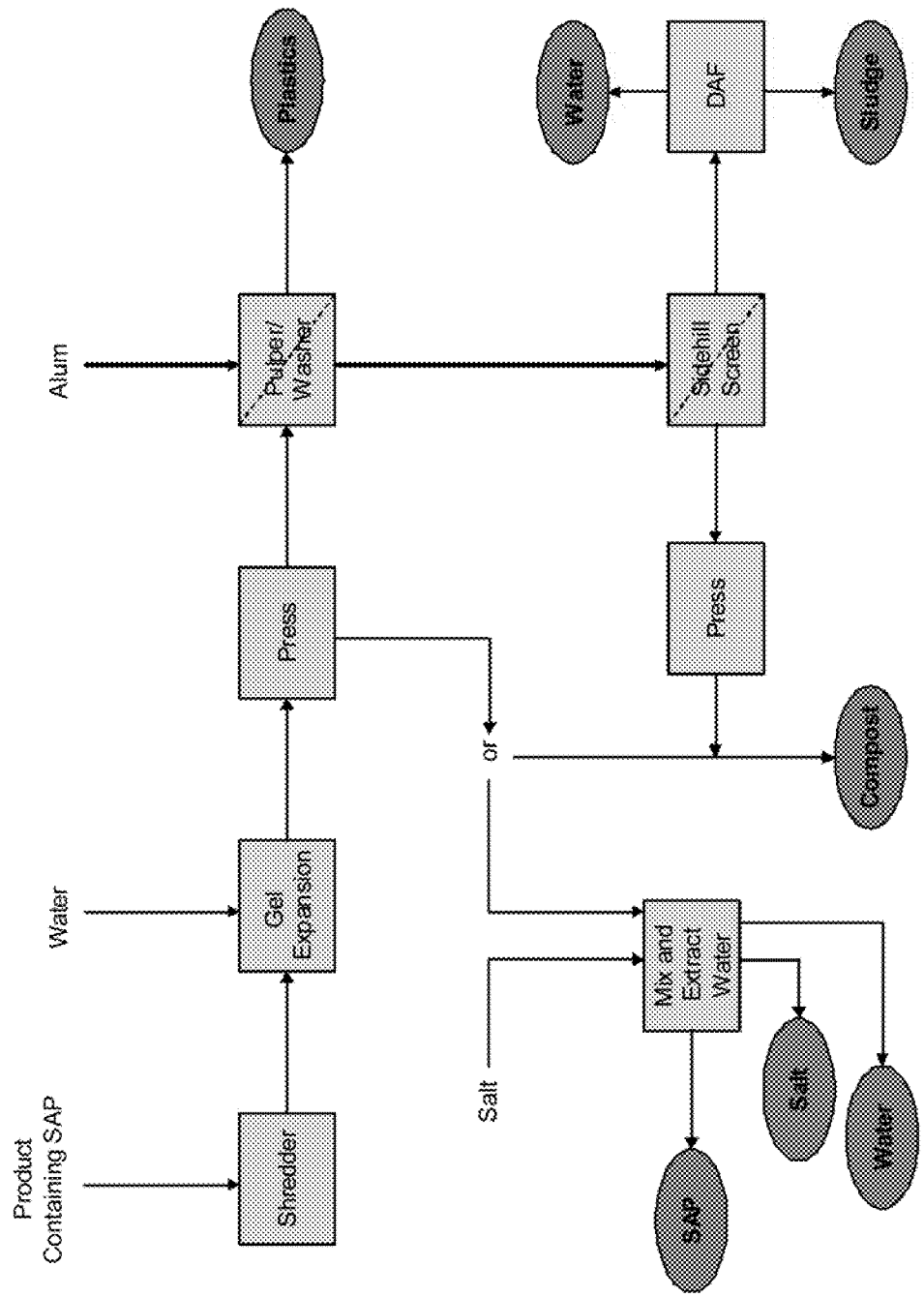
FIG. 1 depicts a flow diagram of one embodiment of the methods described herein for separating a product containing a super absorbent polymer (SAP), a fiber and a plastic into its component parts.

Numbers in the present disclosure are rounded to the nearest significant figure using conventional rounding techniques. Ranges of numbers contained herein are understood to contain the numbers on the upper and lower limits, unless otherwise indicated. For instance, a range "from 1 to 10" is understood to include a range including the number "1," and up to and including the number "10."

The present disclosure includes methods of separating a product including a super absorbent polymer (SAP), a fiber and a plastic into components thereof. This disclosure also includes methods of deactivating SAP in a plastic recovered from a product including SAP. In addition, this disclosure includes methods of producing reusable plastic and SAP from the treatment of a product including SAP. Further, this disclosure includes methods of treatment of a wet SAP such that the SAP is reusable and/or does not comprise alum. As used herein, "alum" refers to $KAl(SO_4)_2$. Other names for alum include kalinite (the mineral form), potash alum, potassium alum dodecahydrate or $KAl(SO_4)_2 \sim 12H_2O$. Aluminum sulfate ($Al_2(SO_4)_3$ or $Al_2O_{12}S_3$) is sometimes incorrectly referred to as alum, however, under the definition of alum herein, alum does not include aluminum sulfate. Finally, this disclosure includes methods of recycling SAP for use as an agglomerating agent.

Previous methods of separating absorbent sanitary paper products continue to produce byproducts having their own disposal issues. U.S. Pat. No. 5,558,745, incorporated by reference herein, describes one such method. This method includes shredding the products and adding a crosslinking agent to harden the SAP. The hardened SAP is then separated from the plastic and fiber. The process uses rotating multi-shell drums and centrifugal cleaners to achieve separation. While the process may achieve separation, there are disadvantages to the separated components. The plastic component, for example, still contains SAP and cellulosic material. The recovered SAP, in it's hardened, granulated state, no longer retains its super absorbent function. This function may possibly be recovered by the addition of large amounts of NaOH (at a pH of 11, for example), for example, but the necessary processing makes the SAP much more expensive than virgin SAP. The granulated SAP is also unsuitable for agricultural and landfill applications, since the crosslinking salts that remain with the SAP, especially alum, are environmentally unfriendly and detrimental to plant growth. Additionally, if Alum is used as the crosslinking agent, any byproducts from this process may be environmentally unfriendly as alum may have a negative impact on plant and animal life.

The benefits of the methods of the present disclosure include cost savings due to reduced use of chemicals, for example, alum. In addition, any residual SAP in the plastic stream is deactivated, making the plastic more attractive as a recycled material. Any composted fiber and/or alum resulting from this process may be more desirable due to reduced or eliminated alum content. And finally, because alum may not be used on the bulk of the SAP, the SAP may have increased options for recycling and increased market value.

Absorbent sanitary paper products ("products") typically consist of (i) a non-woven sheet formed from a liquid permeable material, for example a liquid permeable membrane formed from polypropylene, polyethylene, or woven products formed from cotton or rayon, (ii) a liquid impermeable back sheet formed from for example polyethylene, polypropylene, starch based degradable plastic films, woven cloth or rubber, and (iii) an adsorbent or absorbent core of air laid wood pulp fluff, commonly referred to as air felt, and/or synthetic pulp including polypropylene or polyethylene filaments that may be bonded or unbonded, hemp or other adsorbent fibrous material ("fiber component"). Components (i) and (ii), typically both made of a thermoplastic, may be referred to herein as the "plastic component." The core is typically wrapped or encased in a creped envelope of wet strength tissue paper or a material with similar characteristics. The wrapping on the core may or may not be breathable, biodegradable, odour degradable or degradable or dissolvable by other means. The core usually also contains a super absorbent polymer (SAP) material, which is typically a polyacrylate, polyacrylamide, crosslinked starch or other hydrophilic component, which may be synthetic, and may be in granular, fibrous or laminate form, possessing the ability to bond with water, urine or other body fluids or retain them without substantial release or discharge from the absorbent portion. Diapers and incontinence products typically utilize pressure sensitive adhesives for refastenable tape tabs or similar closure mechanisms. Feminine hygiene pads and incontinence products often use pressure sensitive adhesives for glue lines to attach the pad or liner to the user's undergarments. Diaper and incontinence products typically utilize elastic, polyurethane, puckering and welding or adhesives to create close fitting cuffs around the leg and waist openings to provide a more leakproof fit.

Absorbent sanitary paper products are usually fabricated using SAPs. Such polymers facilitate wetting and wicking properties of the products, especially the cellulosic core usually present in the products, and in particular increase the liquid retention capacity of the absorbent sanitary paper products. Super-absorbent polymers tend to be acrylic polymers and starch-based polymers. At least SAP's made from acrylic polymers are usually cross-linked in the manufacturing process in order to give them compressive and tensile strength along with their super absorbent properties. Further cross-linking may occur in steps in embodiments of the methods of the present disclosure.

As a result of the inherent water absorption properties of SAP, SAP tends to swell on contact with aqueous solutions. Products containing SAP may swell to 2-5 times or more its dry (feed) volume on contact with an aqueous solution. Chemical steps including cross-linking of the SAP in situ or adding agents that reduce the swelling of SAP and/or change the shape and specific gravity of particles of SAP may reduce swelling. In some instances, reduction of swelling, i.e. shrinkage, of SAP should be carried out prior to, or substantially simultaneously with cross-linking of the SAP if cross-linking is desired. Water-soluble alkali and alkaline earth metal compounds are believed to cause shrinkage of the SAP whereas the aluminum, copper, iron and zinc compounds, for example, alum, are believed to cause cross-linking. The treatment of the SAP should be carried out in acidic or substantially neutral solutions, especially at a pH of about 3-8, which limits the alkali and alkaline earth metal compounds that may be used. Examples of chemical compounds that may be added, usually in the form of mixtures, to effect cross-linking of SAP, especially SAP formed from acrylic polymers, include soluble salts of at least one of an alkali metal, an alkaline earth metal, aluminum, copper (II), iron (III), and zinc. Examples of such salts include calcium chloride, calcium nitrate, calcium sulphate, magnesium chloride, magnesium nitrate, magnesium sulphate, disodium phosphate, barium chloride, sodium carbonate and bicarbonate, trisodium phosphate, sodium silicate, potassium sulphide, aluminum sulphate, sodium bisulphate, zinc sulphate, aluminum chloride, sodium sulphate and alum. Aluminum salts e.g. sulphate and chloride, are preferred.

The present disclosure includes methods of separating products that include a super absorbent polymer (SAP), a fiber and a plastic. FIG. 1 depicts one embodiment of this method. This embodiment includes first shredding the products. In addition to shredding, this may also be accomplished by otherwise releasing the SAP and fiber component from the nonwoven and plastic layers by some form of cutting or tearing.

Next, water, an aqueous solution, or another solvent is added to the shredded product, causing the SAP to swell. The product is then moved to a press. Enough water must be added such that separation of the components is maximized in the press, while at the same time attempting to minimize the total amount of water needed. Preferably, this amount includes not more than enough water to saturate the SAP. In some embodiments, water is added in about a 10 to 1 ratio of water to dry product by weight. In other embodiments, the water is added in a range of about from 10:1 to 20:1 water to dry product by weight. Caustic aqueous solution may speed the absorption process, making this portion of the method faster.

The press may include, for example, but not limited to, a screw press. One example of such a press is the Model SP-23-2 (HDS Dewatering Corp., Montreal, Quebec, Canada). Other types of presses may include, for example, but not limited to, hydraulic presses, for example, a ram press (MEVA, Sweden), pneumatic presses, magnetic presses, knuckle joint presses, rolling presses and centrifuges.

Once inside the press, the method includes pressing the product against a screen. The press applies pressure by pressing the wet product and forcing the product against a screen. As used herein, the term "pressing" means to act upon through force, for example pushing or thrusting force, or to move by means of pressure. As used herein, the term "screen" means a body having at least one opening against which the press forces the wet product. Examples of a screen include, but are not limited to, a plate with holes, a sieve, wire mesh, a screen cylinder, and a "basket." The openings in the screen may include perforations, holes, slots, grating, mesh, or the like. Preferably, the openings include holes between 0.049 inches and 0.25 inches in diameter. More preferably, the openings are between 0.0625 inches and 0.125 inches. Most preferably, the openings are about 1/16 inch. In general, the openings are big enough such that the SAP and some of the fiber is pressed through the openings. Preferably, the openings are small enough such that the majority or substantially all of the plastic component remains in the press. In the end, the press separates the product into a plastics component (plastics component) remaining in the press and a SAP and fiber component (SAP and fiber component) pushed out of the press. Up to about 50% of the fiber content may exit the press in the SAP and fiber component. The remaining fiber remains in the press with the plastic, in addition to any residual SAP. In a screw press, for example, the press applies pressure via a screw flight, forcing the wet product against a screen cylinder or "basket." This forces the SAP through the screen plate openings, while the plastic remains in the press.

The benefits of this particular method of separation involving a press is that no salt is required. Salts may be harmful or at least undesirable to the environment. When certain components of the products are used in the environment, for example as compost, salts included in those components may have deleterious effects such as changing the pH of the water in the surrounding ecosystem, and/or killing, injuring or disrupting plant and animal life. Alum, a salt commonly used in separation of SAP from these products, is particularly undesirable in the environment. Therefore, in the methods involving the use of a press, the products preferably do not include a salt, and the steps of adding water and pressing does not include the addition of a salt. In particular, the products and these steps do not include a material that cross-links SAP. Preferably, the products do not include alum and these steps do not include the addition of alum.

The plastics component that remains in the press includes substantially plastic, but also includes some SAP and fiber. Plastic products made from this plastic component may still swell, form a gel, and/or retain water when exposed to water due to the residual amounts of SAP. This result is particularly disadvantageous for recycled products including the plastic component, such as, for example, plastic lumber, which will likely be exposed to water. This result (gelling of residual SAP) may occur even after the plastic/SAP is melted and extruded into a finished product. Thus, it is preferable to remove as much SAP as possible from the plastic component, and deactivate any remaining SAP in the plastic before recycling the plastic composition. As used herein, "deactivate" refers to rendering the SAP substantially unable to swell or retain water. This may be accomplished by either crosslinking the SAP to the point where swelling is minimized or eliminated, or exposing the SAP to a substance that breaks the existing crosslinks. In one embodiment of this disclosure, the method further includes adding a composition that substantially deactivates SAP to the plastics component. In another embodiment, the method further includes substantially separating the remaining SAP from the plastics component. In still further embodiments, the method further comprises both adding a composition that substantially deactivates SAP to the plastics component and substantially separating the remaining SAP from the plastics component. Any combination of these steps yields a purified plastics component and a secondary component which may include water, fiber and SAP. As used herein, a purified plastics component is substantially comprised of plastic, and any remaining SAP in the purified plastics component is substantially deactivated.

In a preferred embodiment, a composition comprising alum is added to the plastics component and then water, fiber and SAP is removed to yield a purified plastics component and a secondary component including the water, fiber and SAP. One of the benefits of the embodiments of the present disclosure is that the alum is only added after the plastic has been substantially separated from the other components, for example by a press as described above. This may require the use of less alum than other prior art methods. In some embodiments, the amount of alum measured in dry weight added to the plastics component is about equivalent to the dry weight of SAP remaining in the plastics component.

The alum composition may also include additional water. The alum may serve two purposes when used after pressing. First, the alum may act as a washing agent to break the bonds between the SAP and the surrounding solids after the pressing adheres them. Second, the alum acts as an agent to sequester the SAP by dewatering, densifying and deactivating the SAP. The alum crosslinks the SAP to a point where swelling and water retention is minimized or substantially eliminated. Then, any secondary components such as water, loose solids such as SAP particles, and fiber (secondary component) are separated from the purified plastics component. The separation can be accomplished using a pulper and a washer, as is known in the art. In one embodiment, the plastic with some contamination is ground into smaller pieces using a single rotor plastics grinder that reduces the plastic to less than about 20 mm diameter pieces. The material exits the grinder and drops into a pulper or agitator tank containing an impeller for separating the components in a slurry.

In an embodiment including a pulper and a washer, the salt, for example, alum, is introduced to the plastics component and agitated. The salt can be added in liquid solution or granulated form. The liquid alum is pumped in at a controlled rate to match approximately equal to the dry weight of SAP in the incoming solids. In one embodiment, the dosing pump includes a positive displacement gear pump. Water may also added to the mix until the suspension is about 1-5% solids by weight.

The plastic and remaining SAP, paper fiber and waste (plastics component) are sent to a coarse screen with openings of about 1-6 mm such as a "friction washer" similar to a FW-560/3000-SP type (REKO Technologies, Putte, Belgium). The mixture is drained and agitated, removing more of the paper fiber, SAP, and waste. The remaining plastic may travel through a washer to flush with clean water further removing impurities, for example an IW 1004-SP type intensive washer (REKO Technologies, Putte, Belgium). After exiting the washer the plastic may go to a screw press for removal of some of the water bringing the solids to about 20-60% solids by mass. For example, a suitable press may include a dewatering screw press type AKUPRESS A 200 (Andritz Kufferath GmbH, Dueren, Germany). In one embodiment, the press may include 3 mm screen openings.

After separating the secondary component (fiber, SAP, waste) from the plastic component, the plastic component may be recycled. In some embodiments, the plastic component is dried before being recycled into another product.

The secondary component may be further separated using a sidehill screen, for example. Water and any accompanying small particles of fiber (water and fiber component) is separated from any SAP and larger sized fiber particles (SAP and fiber component) by the sidehill screen, for example a 24 inch inclined screen with about 0.25 mm slotted screen surface with about a 380 liters per minute flow rate (GL&V, Montreal, Quebec, Canada). The result of this separation is the water and fiber component and the SAP and fiber component.

The water and fiber component may be further subjected to dissolved air filtration. Dissolved air flotation (DAF) is a water treatment process that clarifies wastewaters (or other waters) by the removal of suspended matter such as oil or solids, or in this instance, fiber and/or SAP. The removal is achieved by dissolving air in the water or wastewater under pressure and then releasing the air at atmospheric pressure in a flotation tank or basin. The released air forms tiny bubbles which adhere to the suspended matter, causing the suspended matter to float to the surface of the water where it may then be removed by a skimming device. In general, any wastewaters from the methods of the present disclosure may be subjected to DAF.

The SAP and fiber component may also be further separated by a press, a centrifugal drum, or other means into a substantially water component (water component) and a fiber sludge component (fiber sludge component) including any remaining SAP and fiber. The water component may be subjected to DAF or other wastewater treatment techniques. The fiber sludge component may be disposed in a landfill or used as compost or any other suitable use. The fiber sludge component may be combined with the super absorbent polymer and fiber component from the initial press operation (the component that exited the press) before being disposed, landfilled, composted, disposed in some other manner, or recycled as another product.

The SAP and fiber component that leaves the press during the initial pressing operation (described above) may be recycled in that form, or it may be further processed and/or separated. In certain embodiments, the SAP and fiber may be subjected to a further separation step, including separating the SAP and fiber component into a SAP component (SAP component), which may include substantially SAP, and a fiber component (fiber component), which may include substantially fiber.

In some embodiments, the SAP may be dried, either as part of the SAP and fiber component, or after being separated into the SAP component. These methods include drying the SAP component or SAP and fiber component by salt assisted dehydration. The SAP and fiber component may also be used for compost, or recycled for other products.

One of the products that the SAP and fiber component may be used for is a seeding or reseeding composition for growing vegetation on freshly excavated or fire-damaged ground. In this embodiment, the human waste may or may not be removed from the SAP and fiber component. If it is retained, the human waste may be sanitized by techniques known in the art, for example, but not limited to, radiation, autoclaving and/or pasteurization. Seeds may be added to the SAP and fiber component, and the mixture is distributed on the ground. The seeds sprout into new vegetation. The SAP holds water and slowly releases it, providing a time-release source of water for the seeds. This effect is especially beneficial in arid climates or in fire-damaged areas. In addition, the SAP and fiber remains near the surface of the soil allowing oxidation and sunlight degradation, allowing the SAP to decompose while at the same time establishing ground cover. The fiber in the mixture typically and preferably includes long strings of fiber that interweave. Typically, the fibers are about 1-3 mm long and 50 microns in diameter. The interlaced fibers prevent migration of the SAP, seeds, and underlying soil. This may be especially beneficial in fire-damaged ground or on hillsides. Finally, the waste, if present, may act as a fertilizer. Additionally, any beneficial salts such as potassium salts that remain from the salt assisted dehydration may act as fertilizers. Additional fertilizers known in the art may also be added to the seeding composition.

In another embodiment, SAP recovered from the methods described in this disclosure may be used in fire prevention. The SAP may be wet and sprayed onto houses, barns, fuel tanks and other structures in the face of an oncoming fire. The wet SAP may provide protection from nearby heat and flames.

In yet another embodiment, SAP with or without fiber may be used for the sequestering/collection/removal of toxic waste, hazardous chemicals and heavy metals from water and soil. In one embodiment, dehydrated or partially hydrated SAP is spread across an area of soil. Water and contaminants may be absorbed into the SAP gel, preventing the water from penetrating into the ground water until the material can be moved as a solid. Retention in the SAP may also eliminate the hazard of dripping water and contaminants until the now contaminated SAP is moved to safe location for disposal. Wet SAP in a "gel" state also has a blocking property. Wet SAP swells to block the passage of water and other fluids. This "blocking" is prevented in diapers, for example, by mixing the SAP with fibers that provide a liquid passageway. When there is no passageway, however, SAP can effectively block liquid flow. Thus, a layer of SAP on contaminated ground may prevent more water falling onto the soil and getting contaminated. In another embodiment, SAP may be added to a leaking vessel containing a contaminant. If the SAP settles in the leak, it would block further leakage.

Salt assisted dehydration is a method for drying SAP, or in this case, an SAP and fiber component. This method is much faster than air-drying, and uses less energy than using heat alone to dry the SAP. The method first includes contacting wet or dry super absorbent polymer with a salt or aqueous salt solution. Preferably, the salt used does not cause further crosslinking of the SAP. The salt serves to draw water out of the wet SAP. This method also includes decanting at least a portion of the salt water and water extracted from the wet super absorbent polymer. The remaining portion of the salt water and water extracted from the wet super absorbent polymer may be evaporated. As the water evaporates, the salt remains on the surface of the SAP, drawing even more water out of the SAP particles. Finally, the dried salt may be removed from the super absorbent polymer.

In some embodiments, about 2 grams of salt by dry weight may be added for every gram of SAP dry weight. The initial dewatering is driven by concentration of salt, and therefore more salt will increase water removal before evaporation starts. Once the salt water initially removed from the SAP is decanted, the remaining process will evaporate the water and reach an equilibrium with the salt concentrated on the surface of the SAP. Salt concentration may be adjusted depending on whether a faster dehydration is desired, or whether less salt is used to reduce cost.

In certain embodiments, removing the dried salt from the SAP comprises placing the super absorbent polymer and salt in a dry state into a rotating drum. The inside of the drum may include a screen, or may have holes, slots or other openings or apertures.

The openings are large enough that the salt particles can pass through, but small enough so that substantially all of the SAP and fiber, if present, remain in the drum. The SAP may include particles from 1/10 to 1/2 mm. Consequently, it is preferred that the holes in the drum are about 0.1 mm, or 0.0039 inches. The salts used for salt assisted dehydration may include, for example, but not limited to, NaCl, sea salt, calcium chloride, and potassium salts. The potassium salts may include, for example, but not limited to Potassium Chloride, Potassium Nitrate and potassium carbonate.

Potassium salts are preferable because unlike other salts, potassium salts may actually be beneficial to plants. Indeed, potassium salts are a component of some fertilizers. Thus, when potassium salts are included in a component including SAP that is used as compost or some other agricultural product, the potassium salts may benefit the environment. Further, the decanted water from the salt assisted dehydration product may be used as a liquid fertilizer because of its potassium salt content. Finally, it is preferred that the salt used in salt assisted dehydration does not include alum, or any other salt that causes further crosslinking or irreversible contraction of the SAP, or is environmentally unfriendly.

The methods of the present disclosure also provide a method of producing both a reusable plastic and a reusable SAP from separation of a product containing SAP, a fiber and a plastic into its component parts. Examples of this method is described above using a press and the embodiment depicted in FIG. 1. In these methods, the products are first separated into components including a plastics component including substantially plastic, but also some SAP and fiber (plastic component), and an SAP and fiber component (SAP and fiber component) including substantially SAP, waste and fiber, but also some plastic. In these methods, water may be removed SAP/fiber component with a method comprising salt assisted dehydration, yielding a reusable SAP. Salt assisted dehydration is described, above. The method may further include treating the plastics component with a composition comprising alum in order to remove or deactivate any residual alum in the plastic. In these methods, the initial separation step may include shredding the product, adding water to the product, and pressing the product against a screen as described above. The press separates the products into components including a plastics component, and a super absorbent polymer and fiber component. In these methods, treating the plastics component further with a composition including alum includes adding a composition including alum to the plastic component as described above. One of the benefits of the methods described in this disclosure is that any water recovered may be used in a composting and biogas facility to adjust the moisture of incoming materials.

Figure 2:
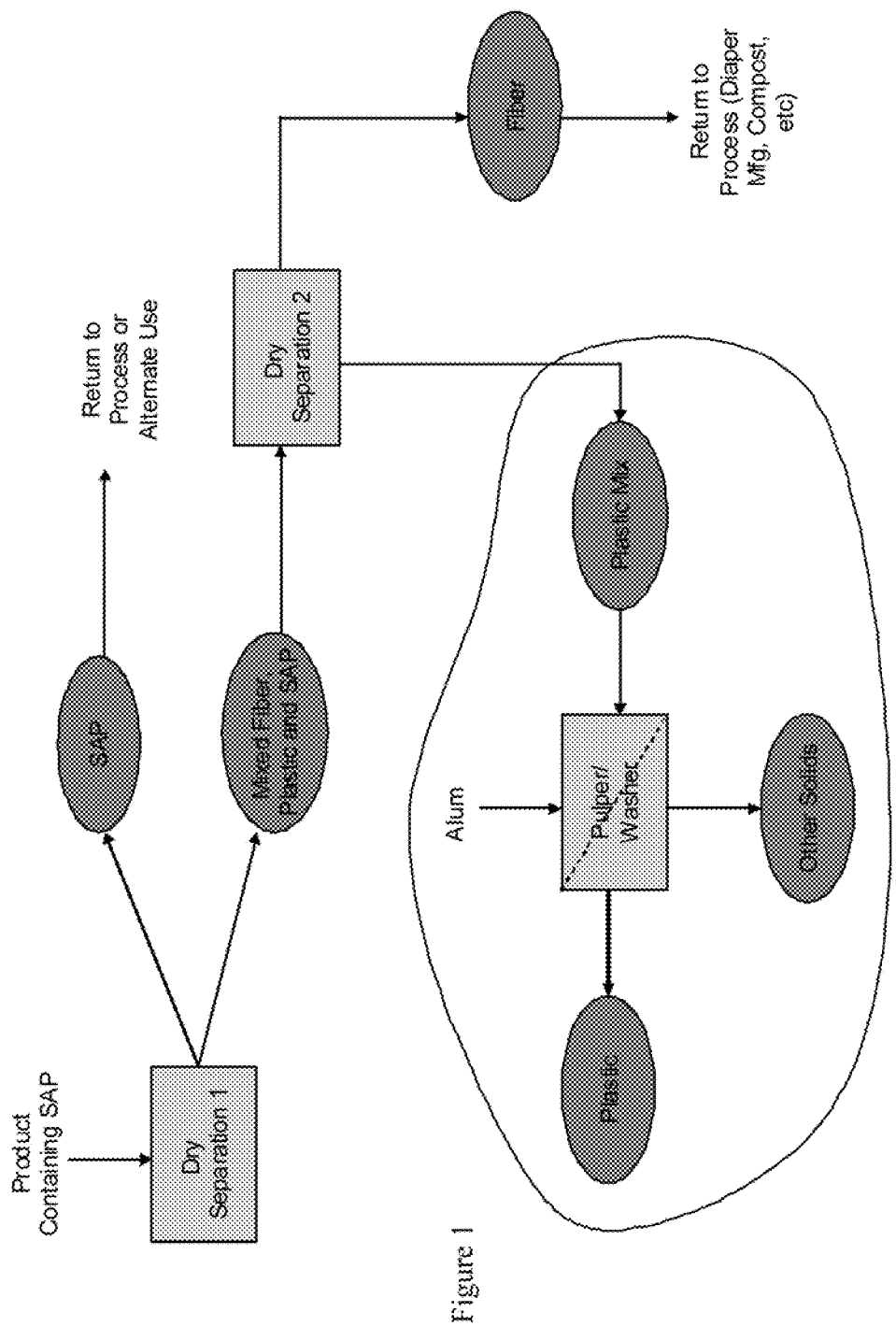
FIG. 2 depicts a flow diagram of one embodiment of the methods described herein for separating a product containing a super absorbent polymer (SAP), a fiber and a plastic into its component parts, and highlighting yet another embodiment of the methods herein for deactivating any SAP remaining in a plastics component (circled portion).

Further embodiments of this disclosure include methods of deactivating super absorbent polymer in a plastic component as part of the separation of a product comprising a super absorbent polymer, a fiber and a plastic. One of these embodiments is depicted in FIG. 2. Initially, separating the products including a super absorbent polymer may be achieved in a substantially dry environment, unlike the method described above using a press.

One dry separation method uses a drum type filter separator, for example, the Model FS-75 fluff separator (Ibis Company, Hoschton, Ga., USA). This device uses a rotating filter with air blowers and a vacuum system to draw the paper fiber away from the plastic after they have been run through a shredder and a "buster fan" that loosens and separates the diaper scraps. Air cyclones can further separate the larger SAP particles from the fluff fiber using the different densities and geometry to separate SAP and fiber. These devices will only remove a percentage of the SAP. None of the separated components have purity.

This process may yield a substantially dry super absorbent polymer component, and a substantially dry fiber component, and a substantially dry plastic component. Alum or a similar salt can be introduced to these streams to condition either the fiber stream with small amounts of SAP still carried with the paper fiber, or to condition the plastics stream which also may include residual SAP.

The fiber may be sent to an agitator tank and combined with water and alum. Low levels of alum can be used to reflect the low levels of SAP in the remaining fiber stream. The fiber stream can now be partially dewatered to isolate the salt and water. The dewatered pulp with small amounts of deactivated SAP can be added to the pulp stream of a typical low end recycled paper mill without any further separation being required. The remaining SAP particles would be incorporated into the paper without seriously degrading the final product. Without the SAP deactivation step, the expanding SAP in the pulp would stick to the surface of the paper machine felts and wires, plugging the surface and preventing water from draining. The active SAP even in small amounts would create spots in the paper commonly called "stickies" in the paper industry.

In the case of the plastics stream, a composition including alum is added to the plastic component, as described above. This method includes adding a composition comprising alum to the plastic component.

Certain other embodiments of this disclosure include a plastic product including the plastic component of any of the methods described herein. Because any remaining SAP in the plastic is deactivated, the plastic may be suitable for recycling into other products including products that may be exposed to water. In certain embodiments, the plastic component is recycled into a plastic product including a product selected from the group consisting of plastic lumber and roofing shingles, or any other suitable plastic product. Other plastic products may be extruded, cast, or molded into useful articles. Another embodiment of this disclosure includes a method of making a plastic product including using any of the plastic components described herein to make the plastic product.

Certain other embodiments of the present disclosure include a method of using recycled super absorbent polymer as an agglomerating agent. This method may include treating the super absorbent polymer with heat and/or a chemical in order to break the crosslinking bonds to form substantially uncrosslinked super absorbent polymer. This method may further include using the substantially uncrosslinked super absorbent polymer as an agglomerating agent. The agglomerating agent may be used in a dissolved air flotation (DAF) process.

The present invention may be embodied in other specific forms without departing from its essential characteristics. The described embodiments are to be considered in all respects only as illustrative and not as restrictive. The scope of the present invention is, therefore, indicated by the appended claims rather than by the foregoing description. All changes which come within the meaning and range of the equivalence of the claims are to be embraced within their scope.

I claim:

1. A method for deactivating and separating the component parts of a material comprising a super absorbent polymer (SAP), a fiber component and a plastic, the method comprising:
    shredding the material;
    adding a salt to the material; and
    agitating the material,
    wherein the material is separated in a substantially dry environment.

2. The method of claim 1, further comprising:
    heating the material.
3. The method of claim 1, further comprising:
    separating the material into:
        a fiber and SAP component, and
        a plastic component.
4. The method of claim 1, further comprising:
    reducing the particle size of the plastic component, and
    washing the plastic component.
5. The method of claim 1, wherein the salt is selected from the group consisting of salts that cause shrinkage in SAP, salts that cause cross-linking in SAP, and combinations thereof.
6. The method of claim 1, wherein the salt is selected from the group consisting of salts of at least one of an alkali metal, salts of an alkaline earth metal, aluminum salts, copper (II) salts, iron (III) salts, zinc salts, and mixtures thereof.
7. The method of claim 1, wherein the salt is selected from the group consisting of calcium chloride, calcium nitrate, calcium sulphate, magnesium chloride, magnesium nitrate, magnesium sulphate, disodium phosphate, barium chloride, sodium carbonate and bicarbonate, trisodium phosphate, sodium silicate, potassium sulphide, aluminum sulphate, sodium bisulphate, zinc sulphate, aluminum chloride, sodium sulphate, alum, and mixtures thereof.
8. The method of claim 7, wherein the salt comprises aluminum sulfate.
9. The method of claim 1, wherein no additional liquid water is added to the material apart from a salt solution.
10. The method of claim 1, wherein water is added to the material in an amount not more than enough to saturate the SAP.
11. The method of claim 1, wherein water is added to the material at a ratio not more than about 10:1 water to dry product.
12. The method of claim 10, wherein the salt is a salt solution.

* * * * *